May 23, 1961   M. GARBUNY ET AL   2,985,783
THIN SCREEN MEMBERS
Filed July 30, 1956

WITNESSES
Edwin E. Bassler
H O Blair

INVENTORS
Max Garbuny &
Walter A. Feibelman
BY
F E Browder
ATTORNEY

2,985,783
THIN SCREEN MEMBERS

Max Garbuny and Walter A. Feibelman, Pittsburgh, Pa., assignors to Westinghouse Electric Corporation, East Pittsburgh, Pa., a corporation of Pennsylvania Filed July 30, 1956, Ser. No. 600,856

10 Claims. (Cl. 313—65)

This invention relates to thin screen members and, more particularly, to phothermionic screens as used in phothermionic image converters. The term "phothermionic" refers to a device utilizing both photoemissive and thermionic effects.

It is known from classical theory that the electrical conductivity of metals is proportional to the mean free path of the conduction electrons of the metal as is shown by the formula $$\sigma = \frac{Ne^2 \Lambda}{2m}\left(\frac{1}{u}\right)$$

in which $\sigma$ is the electrical conductivity, $e$ is the charge of the electron, $\Lambda$ is the mean free path of the electron, $m$ is the mass of the electron and $u$ is the root-mean-square thermal velocity of the electron. Similarly, it is known that the thermal conductivity of the normal pure metals, which is primarily due to electrons, is proportional to the mean free path of the electrons as is shown by the formula $$K_e = \frac{1}{3} C_e u \Lambda_e$$

in which $K_e$ is the thermal conductivity due to electrons, $C_e$ is the heat capacity of the "electron gas" per unit volume, $\Lambda_e$ is the mean free path of the electron and $u$ is the root-mean-square thermal velocity of the electron. In insulators heat conductivity is due to lattice vibrations or phonons and is generally much smaller than that in metals. This is shown by the formula $$K_p = \frac{1}{3} C_p v \Lambda_p$$

in which $K_p$ is the thermal conductivity due to phonons, $C_p$ is the heat capacity per unit volume, $v$ is the root-mean-square thermal velocity of the phonon and $\Lambda_p$ is the mean free path of the phonon, where $v$ and $\Lambda_p$ are considerably smaller than the corresponding values $u$ and $\Lambda_e$ for metal electrons.

In other words, the thermal and electrical conductivity of metals is proportional to the distance which the electron can travel in the metal before it makes a collision. The high values for the conductivities of metals are based in part on the relatively large mean free paths of the electrons which are of the order of several hundred atom diameters. For example, the mean free path of the gold conduction electron, assuming one free electron per atom, is about 400 A. at 0° C. Therefore, if a film of metal is made of a thickness which is small in comparison to the mean free path of the conduction electron, the electrical and thermal conductivity will decrease considerably. However, such ultra thin metallic films, for example, of the order of from 10 to 50 A. thickness, are difficult to produce and are mechanically unstable, especially if the film is to be free or unsupported.

We have found that a screen may be made in such a way as to have the mechanical strength of a comparatively thick metallic screen and yet retain the benefits inherent in ultra thin films. A multilayer screen is made from a number of ultra thin metallic films positioned alternately with regard to a number of very thin layers of an insulator or semiconductor material. The total thickness of the screen is of the order of 1000 to 2000 A. The lateral heat conductivity of the composite of films will then be low since that of the insulator contributes little inherently and that of the metal is considerably reduced by restricting the motion of conduction electrons. The screen will be strong, taut and metallic in appearance, but the thermal and electrical conductivity of such a screen will be only a fraction of the thermal and electrical conductivity that will correspond to the bulk behavior of a metal film with the same total thickness. Such a structure may, for example, be used for use in phothermionic image converters.

A phothermionic image converter which may employ a phothermionic screen of the type discussed is disclosed in the application of Max Garbuny and John S. Talbot, Serial No. 304,502, filed August 15, 1952, entitled "Phothermionic Image Converter," and assigned to the same assignee as the present application. In general, the Garbuny-Talbot application discloses a method of detecting objects by means of converting the thermal emission of the object to a visual image. This thermal emission produces a thermal image of the object upon a temperature-sensitive photoemissive surface called a phothermionic screen or retina. The heated areas of the photoemissive surface contain electrons with higher average kinetic energies than the average kinetic energy of the electrons of the unheated portions. Therefore, when the photoemissive surface is scanned with a light spot of a desired wave length, more electrons will be ejected from the heated areas than the unheated areas, and a photocurrent may be collected which is modulated in its intensity by the temperature distribution of the photoemissive surface. This photocurrent may be displayed as a visual image on a luminescent screen of a cathode-ray tube. As can be seen, the phothermionic screen, which is also called a retina, plays a vital part in devices of this type, and, therefore, a mechanically stable film having the electrical and thermal properties of an ultra thin film has been found to be extremely desirable in devices such as a phothermionic image converter and in many other devices.

It is an object of this invention to provide an improved thin screen member such as may be used in a phothermionic image converter.

It is another object to provide an improved thin screen member having the electrical and thermal properties of an ultra thin film without the mechanical instability of such ultra thin film.

It is a further object of this invention to provide an improved method of making a thin screen member.

These and other objects of our invention will be apparent from the following description taken in accordance with the accompanying drawing throughout which like reference characters indicate like parts, which drawing forms a part of this application, and in which.

Figure 1:
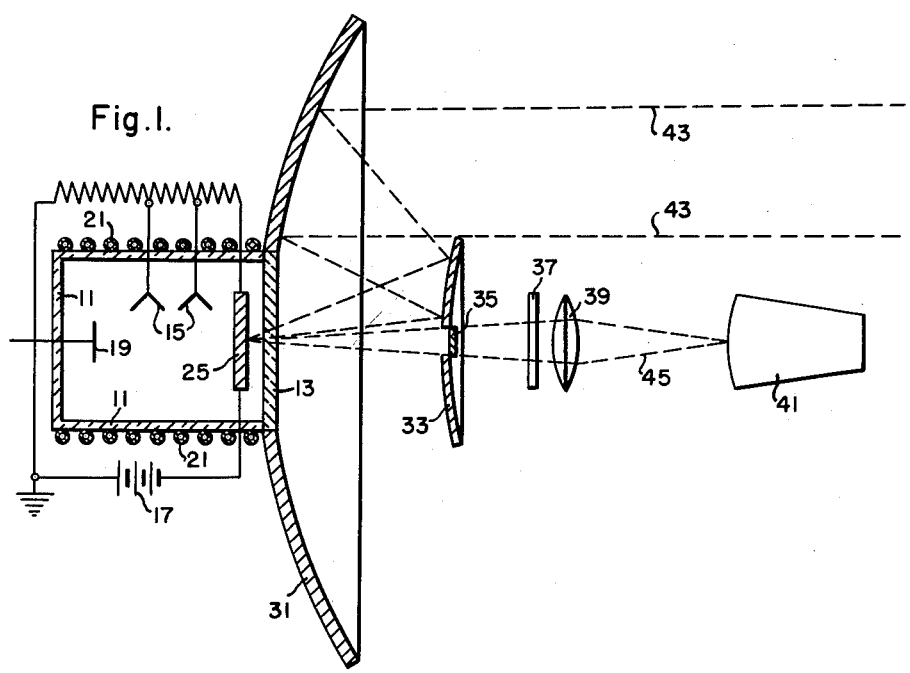
Figure 1 shows a schematic side sectional view of a phothermionic image converter including a thin screen member constructed in accordance with one embodiment of our invention.
Figure 2:
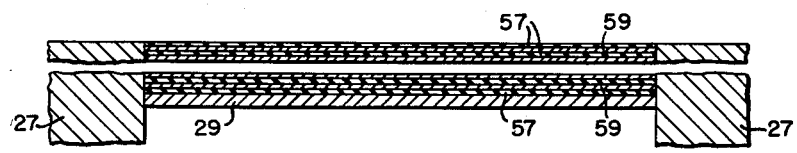
Fig. 2 shows a sectional view of a thin screen member constructed in accordance with one embodiment of our invention.

Referring in detail to Figs. 1 and 2, there is shown a phothermionic image converter embodying our invention. A vacuum-tight envelope member 11 having a window member 13 encloses a phothermionic screen or retina 25. A collector electrode 19 is suitably positioned within the envelope and a plurality of multiplier electrodes 15 are positioned between the retina 25 and the collector electrode 19. A cooling coil member 21 surrounds the envelope member 11. An optical system is provided for focusing a thermal image of infrared radiation 43 onto the retina 25 through the window member 13. This optical system may be in the form of a Cassegrainian telescope including a parabolic collecting mirror 31, a hyperbolic reflecting mirror 33 and a plane dichroic mirror 35 which is placed in the "blind spot" of the hyperbolic reflecting mirror 33. Also provided is a scanning kinescope 41 which is used as a scanning light source. A lens member 39 and a filter member 37 may also be provided for focusing and directing visible or ultraviolet light 45 of the desired wave length from the kinescope 41 onto the retina 25.

A completed retina is shown in Fig. 2, including the retina support member 27, a plurality of metallic layers 59 and a plurality of insulating or semiconductor support layers 57. A photoemissive layer 29 may also be incorporated in the retina 25.

The operation of the apparatus shown in Fig. 1 and the completed retina 25 shown in Fig. 2 may briefly be described in the following manner. The thermal image of infrared radiation 43 is focused onto the retina 25 by the Cassegrainian optical system. This thermal image heats small areas of the metallic layers 59, thereby forming a temperature image corresponding to the temperature pattern of the observed object. The small areas of the metallic layers 59 which have been heated by the impinging infrared radiation 43 in turn heat small areas of the insulating layers 57 and the remaining metallic layers 59. Finally, the photoemissive layer 29 is heated by thermal conduction from the insulating layers 57 and metallic layers 59. Therefore, the small heated areas of the photoemissive layer 29 have electrons with higher average kinetic energy than the average kinetic energy of the electrons in the unheated areas of the photoemissive layer 29. As the retina is then scanned by light 45 from the scanning kinescope 41, the electrons will be preferentially emitted from the heated areas of the photoemissive layers 29 with a density that is a function of the temperature of the retina 25. If an area is heated to a high temperature due to the impinging infrared radiation 43, a large number of electrons will be emitted from the photoemissive layer 29. As the visible light 45 from the kinescope 41 scans the retina, the electrons emitted will be received either directly or indirectly by the collector electrode 19. It will readily be seen that this current pulse obtained from the collector electrode output circuit may be utilized to gate the grid of a conventional display device, such as a kinescope, to obtain a light image corresponding to the thermal image on the retina 25.

It may be desirable to employ secondary electron amplification as by the use of electron multiplier electrodes 15, two of which electrodes are shown in Fig. 1. These two multiplier electrodes 15 are, of course, representative of a larger number of such electrodes which would probably be employed in practice. A source of potential 17 is connected between the retina 25 and the multiplier electrodes 15 of the electron multiplier so as to cause electrons to be accelerated from the retina 25 toward the multiplier electrodes 15.

The completed retina 25 shown in Fig. 2 may be comprised of a number of metallic layers 59 alternately disposed with a number of insulating or semiconducting support layers 57. We have found that a suitable thickness of the metallic layers 59 is on the order of from 10 to 50 A., or, in other words, somewhat less than 1/8 the mean free path of the conduction electrons at 0° C. The total thickness of the retina 25 may be on the order of from 1000 to 2000 A. A suitable thickness of the insulating or semiconducting support layer is also on the order of from 10 to 50 A. Metallic layers may be comprised of any of a number of metals, such as gold, nickel, palladium, platinum, and, in general, any metal that may be desired. If the metals are to be deposited in the presence of the oxygen, they should be metals that will not be attacked by oxygen as aluminum might be. However, if they are to be deposited in a vacuum, a metal such as aluminum may be utilized. A number of materials may be used for the insulating or semiconducting layers 57. Such suitable materials include silicon monoxide, silicon dioxide, germanium dioxide, metal oxides and silicon. The photoemissive layer 29 may be a material such as cesium-antimony, bismuth-rubidium, tellurium-cesium, rubidium-antimony, tellurium-rubidium or cesium-bismuth.

In general, suitable materials for retinas 25 may be many and varied, but the completed retinas should have a number of characteristics including (1) low heat capacity in order to establish a thermal image in as short a time as possible, (2) sufficient strength to make manufacture and stability possible, (3) mirror-like smoothness in order to provide for high uniformity of response, (4) low heat conductivities so that a temperature pattern of high definition may be established over even a small total retina area despite the tendency of heat conductivity to equalize existing differences of temperature in lateral directions. Also, retinas must be able (1) to provide a photolayer of sufficient uniformity in which the current yield in response to scanning light of specified wave length is a sensitive function of temperature, (2) to show a quantum efficiency in these wave length regions high enough so that the variations in current due to temperature are large compared to random fluctuations due to shot effect, (3) to insure maximum variation of temperature in response to incident infrared image by limiting all heat exchanges to radiation, i.e., by thermally isolating the structure, (4) to provide for high absorption of infrared radiation, and (5) to allow conduction of the photocurrent in a transverse direction with respect to the retina 25. Thus, there results a necessity for a mechanically stable member having the thermal and electrical characteristics of an ultra thin film, which member must be freely supported so that the area in thermal contact with the support member is very small in comparison to the radiated surface. Retinas made of insulators or semiconductors, such as silicon monoxide, provide in the attainable thicknesses the requirements of thermal insulation but show a wrinkled appearance that lends to non-uniformity of response. Metallic films of the thicknesses obtainable show a mirror-like smoothness but conduct heat so efficiently that temperature differences are washed out over large areas and high definition becomes impossible. It has not been possible to produce freely supported ultra thin films of a metal, such as gold, of thicknesses smaller than about 300 to 500 A. In the multilayer structure of our invention, the total thickness of the structure may amount to more than 1000 A., but the actual heat conductivity may correspond to only a small fraction of the heat conductivity normally associated with a structure with a thickness of over 1000 A. Other advantages inherent in the wafer-type structure lie in the possibility of reducing the heat capacity materially below that of ordinary materials, which is a result of the "freezing in" of degrees of freedom or lattice vibrations because the thickness of the individual layers has been reduced below the mean free path of phonons. An additional advantage is found in the greater mechanical strength of composite films of this type.

Films of this nature have uses other than that in the phothermionic image converter. As these films have thermal and electrical resistivities approaching those of semiconductors, yet are metallic in terms of the temperature dependency of this quantity, they will vary in resistance only slightly with higher temperature.

Films of the structure discussed here have not only low heat conductivity, but also low conductivity for direct current. Nevertheless, because of capacitive effects, they conduct well for high frequency ranges, especially those corresponding to electromagnetic waves in the infrared. Hence desired optical properties will result, in terms of absorption or reflection of infrared, for suitably spaced metal layers. These optical properties can thus be obtained simultaneously with low lateral heat spread.

The retina 25 may be made by depositing a film of thermally removable organic material, such as nitrocellulose, upon the retina support member 27, which may be made of a material such as Invar, nickel or stainless steel. The alternate metallic layers 59 and insulating or semiconductor layers 57 are then applied by a method such as evaporation. The organic material may then be removed by baking, and layer 29 of photoemissive material may be applied by evaporation.

Figure 3:
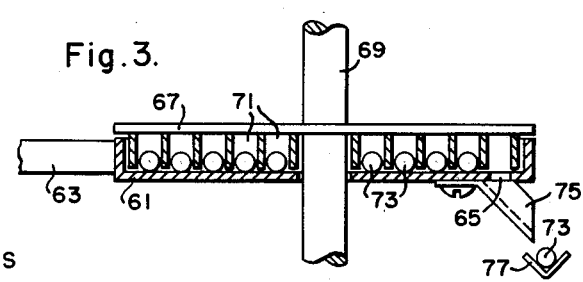
Fig. 3 shows a side view of apparatus suitable for use in constructing an embodiment of our invention.

Since the disclosed structure is the end result of from 20 to 50 alternative evaporations of metal and insulator, it is not practical to repeat the processes of loading, evacuating, evaporating and readmitting of air for each single sublayer. On the other hand, alternative evaporations by alternate heating of the coils carrying large amounts of metal and insulator is also impractical because of inaccurate results obtained. An apparatus which may be used to construct a multilayer retina as disclosed is shown in Fig. 3. A stationary drum member 61 having an aperture 65 is supported by the stationary drum support member 63. A rotatable drum member 67 is positioned within the stationary drum member 61 and may be turned by a rotating axle member 69. The rotatable drum member 67 includes a number of chambers 71 in which pellet members 73 of the desired materials may be placed. For example, alternate pellets of gold and silicon monoxide may be placed in the chambers 71. As the rotatable drum member 67 is turned, the pellet 73 of the desired material passes through the aperture 65, down the channel or spout member 75 and is deposited in an evaporation member or holder member 77 which may be in the form of a filament or boat member. The pellets are evaporated to completion one at a time, and as they contain a measured amount of the desired material, a predetermined quantity of the material is therefore evaporated and deposited to form a single layer of the desired thickness.

In general, the use of ultra thin screen members is expected to result in great uniformity, excellent temperature sensitivity and good picture definition of retinas, such as may be used in phothermionic image converters. The high strength of these screen members and the very short thermal time constants are desirable characteristics.

While the present invention has been shown in a few forms only, it will be obvious to those skilled in the art that it is not so limited but is susceptible of various changes and modifications without departing from the spirit and scope thereof.

We claim as our invention:

1. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said support layers having a thickness between approximately 10 A. and approximately 50 A.

2. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said metallic layers having a thickness between approximately 10 A. and approximately 50 A.

3. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said support layers and each of said metallic layers having a thickness between approximately 10 A. and approximately 50 A.

4. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said support layers having a thickness between approximately 10 A. and approximately 50 A., said support layers being composed of a material that is a solid oxide.

5. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said support layers having a thickness between approximately 10 A. and approximately 50 A., said support layers being composed of a material that is an insulator.

6. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers, said support layers and said metallic layers being alternately disposed, each of said support layers having a thickness between approximately 10 A. and approximately 50 A., said support layers being composed of a material that is a semiconductor.

7. A thermal image converter comprising a screen member for the conversion of thermal radiation to a temperature pattern, thermally sensitive means adjacent said screen member responsive to said temperature pattern, said screen member comprising at least ten non-metallic support layers and at least ten metallic layers, said support layers and said metallic layers being alternately disposed, each of said metallic layers having a thickness between approximately 10 A. and approximately 50 A.

8. A thermal image converter comprising a screen member for the conversion of thermal radiation to a temperature pattern, thermally sensitive means adjacent said screen member responsive to said temperature pattern, said screen member comprising a plurality of non-metallic support layers and a plurality of metallic layers composed of a metallic material, said support layers and said metallic layers being alternately disposed, said metallic layers having a thickness less than 1/8 the mean free path of the conduction electrons of said metallic material at 0° C.

9. A thermal image converter comprising a screen member for the conversion of thermal radiation to a temperature pattern, thermally sensitive means adjacent said screen member responsive to said temperature pattern, said screen member comprising a plurality of support layers, said support layers being composed of an oxide selected from the group consisting of silicon monoxide, silicon dioxide and germanium dioxide, and a plurality of metallic layers, said metallic layers being composed of a material selected from the group consisting of gold, nickel, palladium and platinum, said support layers and said metallic layers being alternately disposed, each of said support layers and each of said metallic layers having a thickness between approximately 10 A. and approximately 50 A.

10. A thermal image converter comprising a screen member for the conversion of thermal radiation to a temperature pattern, thermally sensitive means adjacent said screen member responsive to said temperature pattern, said screen member comprising a plurality of support layers and a plurality of metallic layers, said support layers and said metallic layers being alternately disposed, said thermally sensitive means comprising a photoemissive layer.

References Cited in the file of this patent

UNITED STATES PATENTS

| | | |
|---|---|---|
| 1,784,611 | Polanyi et al. | Dec. 19, 1930 |
| 1,919,988 | Rupp | July 25, 1933 |
| 2,043,733 | Brasch et al. | June 9, 1936 |
| 2,060,977 | De Boer et al. | Nov. 17, 1936 |
| 2,153,363 | Bruche | Apr. 4, 1939 |
| 2,173,904 | Holst et al. | Sept. 26, 1939 |
| 2,297,607 | Blackburn | Sept. 29, 1942 |
| 2,756,167 | Barnett | July 24, 1956 |
| 2,766,144 | Lidow | Oct. 9, 1956 |
| 2,769,148 | Clogston | Oct. 30, 1956 |
| 2,771,055 | Kelly et al. | Nov. 20, 1956 |
| 2,796,562 | Ellis et al. | June 18, 1957 |
| 2,798,823 | Harper | July 9, 1957 |
| 2,808,351 | Colbert et al. | Oct. 1, 1957 |
| 2,853,402 | Blois | Sept. 23, 1958 |

FOREIGN PATENTS

| | | |
|---|---|---|
| 439,457 | Great Britain | Dec. 6, 1935 |